(12) United States Patent
Richardson et al.

(10) Patent No.: US 8,090,749 B2
(45) Date of Patent: Jan. 3, 2012

(54) SYSTEM AND METHOD OF MANAGING SAFETY INFORMATION

(75) Inventors: Dale Richardson, Fairview (CA); Bryan Richardson, Edmonton (CA); Stephen Barry, Edmonton (CA)

(73) Assignee: Worldwide QC Operations Inc., Edmonton (CA)

( * ) Notice: Subject to any disclaimer, the term of this patent is extended or adjusted under 35 U.S.C. 154(b) by 485 days.

(21) Appl. No.: 12/231,758

(22) Filed: Sep. 5, 2008
(Under 37 CFR 1.47)

(65) Prior Publication Data
US 2009/0254558 A1  Oct. 8, 2009

(30) Foreign Application Priority Data

Sep. 7, 2007  (CA) .................................. 2600616

(51) Int. Cl.
*G06F 7/00* (2006.01)
(52) U.S. Cl. ........................................ 707/803
(58) Field of Classification Search .................. None
See application file for complete search history.

(56) References Cited

U.S. PATENT DOCUMENTS

| 5,311,438 | A * | 5/1994 | Sellers et al. ............... 700/96 |
| 6,065,000 | A * | 5/2000 | Jensen .......................... 705/4 |
| 2002/0129033 | A1 * | 9/2002 | Hoxie et al. ............... 707/101 |
| 2003/0141971 | A1 * | 7/2003 | Heiken, Jr. ................ 340/506 |
| 2004/0010517 | A1 * | 1/2004 | Fetherston ............... 707/104.1 |
| 2005/0171941 | A1 * | 8/2005 | Chen et al. ................... 707/3 |
| 2008/0189142 | A1 * | 8/2008 | Brown et al. ................ 705/4 |
| 2008/0222102 | A1 * | 9/2008 | Hanson ........................ 707/3 |

OTHER PUBLICATIONS

"Microsoft Computer Dictionary, Fifth Edition," Microsoft Press, 2002.*
Joint Helicopter Safety Implementation Team, "Safety Management System Toolkit," The International Helicopter Safety Symposium 2007.*
International Helicopter Safety Team, "Safety Management System Toolkit, Edition 1," 2006.*

* cited by examiner

*Primary Examiner* — Aaron Sanders
(74) *Attorney, Agent, or Firm* — Dilworth & Barrese, LLP (57) ABSTRACT

A safety management system for use in industry, such as the oil and gas industry, is disclosed. The system comprises a database component for storing safety information including project information comprising at least one project entry. Each project entry has a unique project identifier and project data. The database component further includes safety card information comprising at least one safety card entry, and a unique safety card identifier, a project identifier selected from the unique project identifiers of the at least one project entries and safety card data. The database component further comprising notification information comprising at least one notification entry. Each notification entry comprising a unique notification identifier, a project identifier selected from the unique project identifier of the at least one project entries and notification card data. The safety management system further comprises a control component for generating notifications and providing notification information to the database component.

15 Claims, 3 Drawing Sheets

SYSTEM AND METHOD OF MANAGING SAFETY INFORMATION

RELATED APPLICATIONS

The current application claims priority of Canadian application 2,600,616 filed on Sep. 7, 2007, which is incorporated by reference in its entirety.

TECHNICAL FIELD

The present invention relates generally to safety management, and in particular, to a system and method for the management of project safety.

BACKGROUND

The oil and gas sector has large scale projects. The projects may include the construction of new facilities and pipelines, new drilling exploration, maintaining current infrastructure, etc.

During projects it is important for companies to maintain safety information. This may include information concerning the occurrence of accidents. Currently this information is maintained in hard copy form. When an accident occurs, a report is filled out. This information is maintained for due diligence purposes. Government regulations also require that certain accidents be reported (depending on their severity).

The current system used by most companies only provides a paper trail of accidents that have occurred. These hard copy reports are often stored in an off-site location, until they are required to be reviewed. This may be required if, for example, a government body investigates the safety of a project.

A need therefore exists for a system maintaining the safety information for projects, such as oil and gas sector projects. It may be advantageous to have easy access to the information, allowing the safety of a project to be determined in a timely manner.

SUMMARY

In accordance with one illustrative embodiment there is provided a safety management system for use in industry, comprising a database component for storing safety information. The database component comprises project information comprising at least one project entry. Each project entry comprises a unique project identifier and project data. The database component further comprises safety card information including at least one safety card entry. Each safety card entry comprises a unique safety card identifier, a project identifier selected from the unique project identifiers of the at least one project entries and safety card data. The database component further comprises notification information comprising at least one notification entry. Each notification entry comprises a unique notification identifier, a project identifier selected from the unique project identifier of the at least one project entries and notification card data. The safety management system further comprises a control component for generating notifications and providing notification information to the database component.

In accordance with another illustrative embodiment, there is provided a method of managing the safety of projects, such as oil and gas industry projects. The method comprises receiving project data, storing in a database project information comprising the received project data and an associated unique project identifier, receiving safety card data, storing in the database safety card information comprising the received safety card data, an associated unique safety card identifier and a project identifier of the at least one unique project identifiers associated with each project data and generating a notification and associated notification information if a project safety performance index (SPI) is above an SPI threshold.

In accordance with another illustrative embodiment, there is provided a computer-readable medium storing instructions or statements for use in the execution in a computer of a method of managing the safety of projects, such as oil and gas industry projects. The method comprises receiving project data, storing in a database project information comprising the received project data and an associated unique project identifier, receiving safety card data, storing in the database safety card information comprising the received safety card data, an associated unique safety card identifier and a project identifier of the at least one unique project identifiers associated with each project data and generating a notification and associated notification information if a project safety performance index (SPI) is above an SPI threshold.

BRIEF DESCRIPTION OF THE DRAWINGS

Features and embodiments will be described with reference to the drawings wherein.

DETAILED DESCRIPTION

A safety management system suitable for use in industry is described herein. The industry described herein relates to the oil and gas industry, however it may be used in other industries such as, but not limited to, the construction industry. The safety management system provides for tracking of safety information. When an accident occurs in a project, an electronic safety card is filled out and entered into the safety management system. The system determines a safety performance index (SPI) for the project as new safety cards are entered. If a project's SPI crosses a threshold, the system generates a notification. The generated notification informs an appropriate person of a safety concern for the project. This may result in an action being taken, such as implementing new safety procedures, training workers, temporarily stopping the project, etc. When a notification is generated, the system may also store the notification information.

The system stores all of the safety card information and safety notifications for a project. The safety information may be accessed during a project or after the completion of the project. The safety information can be used to evaluate the effectiveness of safety procedures, provide compliance information with government regulations, provide a degree of due diligence, etc.

Figure 1:
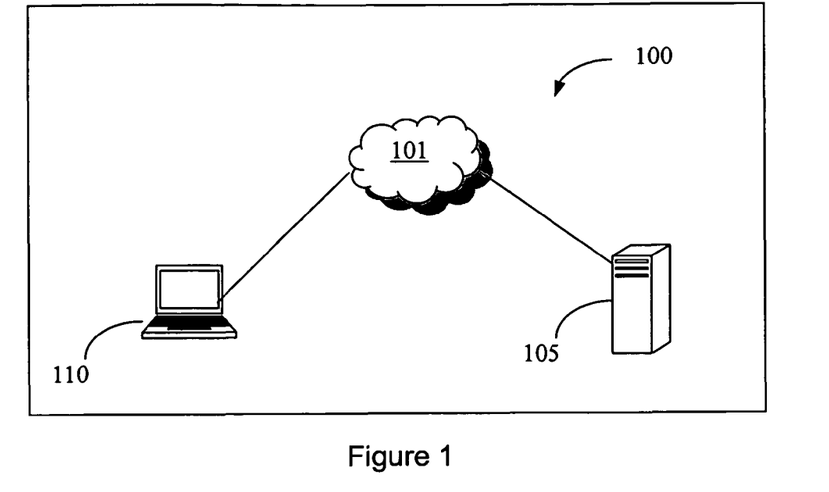
FIG. 1 shows in a block diagram an illustrative embodiment of a safety management system.

FIG. 1 shows in a block diagram an illustrative embodiment of a safety management system 100. The safety management system 100 comprises a safety management server 105 connected to a network 101, such as the Internet, and through the network 101 to a computing device 110. The computing device 110 may provide a user interface to the safety management server 105. Although only one computing device 110 is shown, the system 100 may have multiple devices connected, either through a wired or wireless connection. The computing devices may also be connected directly to the safety management server 105. One or more computers or servers may implement the server 105.

Figure 2:
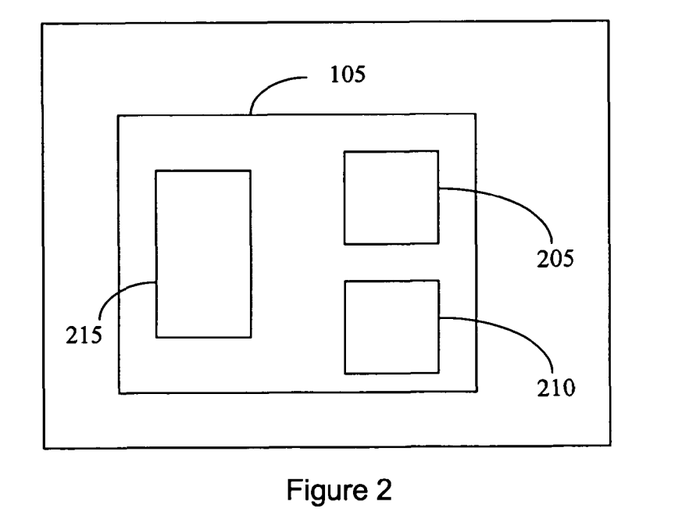
FIG. 2 shows in a functional schematic an illustrative embodiment of the safety management server.

FIG. 2 shows in a functional schematic an illustrative embodiment of the safety management server 105. The safety management server 105, may comprise a database component 205, a control module 210 and a user interface module 215.

Database Component 205

Figure 3:
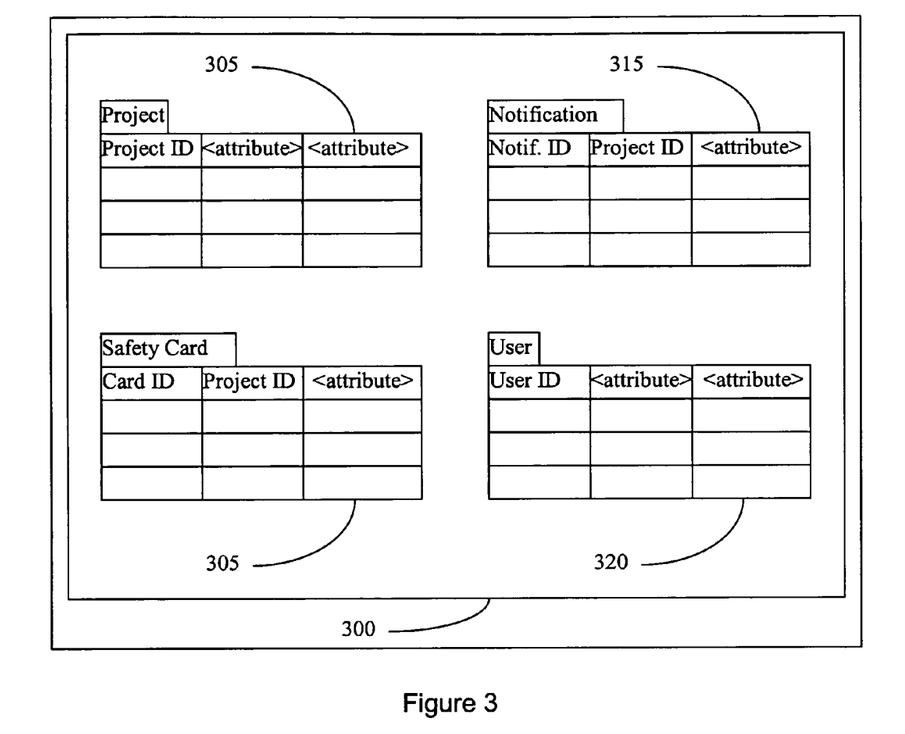
FIG. 3 shows in a schematic an illustrative embodiment of a logical representation of a database.

FIG. 3 shows in a schematic an illustrative embodiment of a logical representation of a database 300. The database 300 may form part of the database component 205. The database component 205 may also comprise database management components (not shown) for implementing the functionality described herein. The database 300 comprises a project table 305, a safety card table 310 and a notification table 315.

The project table 305 stores project information. Each project record is identified by a unique project identifier. In addition to the project identifier, the project table stores data about each project. The project attributes may include, for example:

Project ID: Unique project identifier within the safety management system
Project Number: Additional project identifier, for example may be the project identifier used by the company
AFE Number: authorization for expense number
Project manager: Name of project manager, alternatively unique key indicating a user record of the project manager
Consultant: Name of consultant company or name of individual consultant
Address
City
Province
Postal Code
Phone
Fax
Contact: Main contact for project
Contact Info
Client Name: company name if the system is used to track projects for more then one company
Client Address
Client City
Client Province
Client Postal Code
Client Phone
Client Cell Phone
Client Email Contact
Client Info
Estimated Man Days: The estimated number of man days required to complete a project
Estimated hours per day: The estimated number of hours worked by a worker per day
Estimated schedule
Total Hours
SPI index number: SPI threshold
Total SPI Cards: number of cards received before sending notification (regardless of SPI value)
Level 1 SPI Cards: number of cards of a level 1 severity received before sending notification (regardless of SPI value)
Level 2 SPI Cards: number of cards of a level 2 severity received before sending notification (regardless of SPI value)
Level 3 SPI Cards: number of cards of a level 3 severity received before sending notification (regardless of SPI value)
Level 4 SPI Cards: number of cards of a level 4 severity received before sending notification (regardless of SPI value)
Level 5 SPI Cards: number of cards of a level 5 severity received before sending notification (regardless of SPI value)

The safety card table 310 stores safety card information. Each safety card record is identified by a unique safety card identifier. In addition to the safety card identifier, the safety card table 310 also stores a project identifier with each safety card record. The project identifier identifies the project that the safety card is associated with. The safety card table 310 also stores data about each safety card. The safety card attributes may include, for example:

SPI Card ID: Unique identifier of safety card
Project ID: Unique project identifier of the project the SPI card is associated with
Entering UserID: Unique user ID of user entering SPI card information
Date: Date of accident or date of entering safety information
SPI level: Severity level of SPI card
SPI rating: SPI value of SPI card used in calculating project SPI
Event Observed: description of accident or event observed
Code Numbers: for indicating relevant safety codes associated with SPI card
Comments: additional comments Safety cards may be grouped into different severity levels. The severity level may be based on the nature or severity of the accident. For example a 'near miss' accident may be a severity level 1, a minor accident requiring no medical treatment may have a severity level 2. A minor accident requiring medical treatment may have a severity level of 3. An accident requiring hospitalization may have a severity level of 4. A fatal accident may have a severity level of 5.

The SPI ratings may be based on a set of rules, such that for any type of accident an SPI rating is given (or can be calculated). In this manner, the SPI rating is objective. The person completing the safety card form indicates what has happened (for example through a series of check boxes on the safety card form) and the system determines the SPI rating from the boxes checked, or the information entered.

Additionally or alternatively, the SPI rating may be based on the severity level. It may be used to provide a finer level of detail as to the severity, as well as to allow a worker to subjectively rate the severity of the accident. The severity level may be determined objectively. If an accident requires a worker to be hospitalized, the severity level (using the above example levels) would be objectively determined as 4. The severity level may then be used to determine a possible range of SPI ratings, from which the worker filling out the SPI form may select the rating they believe is appropriate. For example, severity level 1 may be associated with an SPI rating of between 0 and 3. A severity level 2 may be associated with an SPI rating of between 4 and 5. A severity level 3 may be associated with an SPI rating of between 7 and 9. A severity level 4 may be associated with an SPI rating of between 10 and 12. A severity level 5 may be associated with an SPI rating of between 15 and 16. In this manner the system provides a level of subjectiveness. This may be advantageous when the outcome of an accident does not reflect the possible severity. For example, a worker not wearing a safety harness may nearly fall from a building. The worker most likely will not be harmed; however, if they had fallen it might have been fatal. Using the subjective SPI rating the potential consequences of accidents may be accounted for. This can provide a level of proactive safety management, as it enables an accident to be treated as if it is more severe, and as such, may require additional safety actions to be taken.

The notification table 315 stores notification information. Each notification record is identified by a unique notification identifier. In addition to the notification identifier, the notification table 315 also stores a project identifier with each notification record. This identifies the project that the notification is associated with. The notification table 315 also stores data about each notification. The notification attributes may include, for example:

Notification ID—Unique identifier of notification

Project ID: unique identifier of project the notification is associated with

Date: date the notification was sent

Control Component 210

Figure 4:
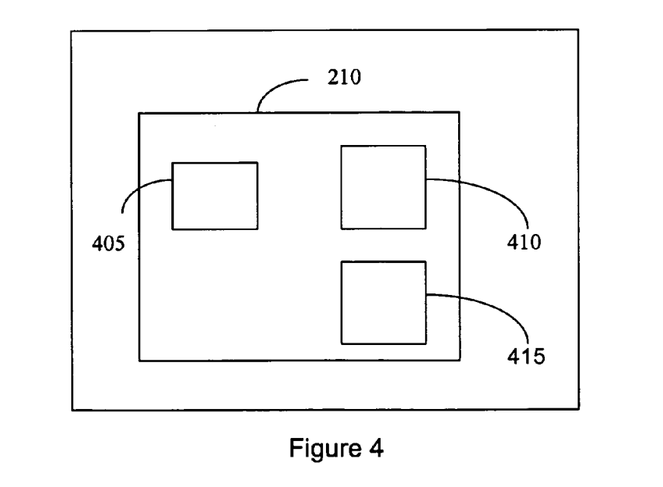
FIG. 4 shows in a schematic an illustrative embodiment of a control module.

FIG. 4 shows in a schematic an illustrative embodiment of the control module 210. A notification component 405 comprises logic for generating a notification. When a new safety card is entered into the safety management system, the notification component 405 determines an updated SPI for the project, and checks if the new SPI is above an SPI threshold. When generating the notification, the notification component 405 determines what information to include in the notification. The indications of what information to include in a notification may be hard coded into the notification component 405, or it may be stored in a configuration file, or in the database 300, etc. If this information is hard coded into the notification component 405, it is not easily changed. If the information is stored in a file or database the notifications can be more easily customized.

In addition to sending notifications based on a project SPI crossing a threshold, the notification component 405 may send notifications based on the number of SPI cards received. For example, a notification may be sent to a particular person if three SPI cards have been received regardless of whether the project SPI has crossed a threshold or not. A window size may be specified to indicate the number of days to go back, or include, when determining if the number of safety cards has been reached. For example, a window size of one week may be specified, and a total SPI card number of 3 indicated so that if 3 safety cards are received within 7 days a notification will be sent. The number of SPI cards and the window size may be specified for all severity levels, or different numbers may be indicated for each severity level. For example, a notification may be sent if 5 severity level 1 cards are received in 30 days, and a notification may be sent if 2 severity level 3 cards are received in 60 days. It is possible to indicate different users to send the notifications to.

This customization of notification may be accomplished by a notification setup component 410. The notification setup component 410 allows a user (for example a project manager or company official) to specify the information to include in a notification. This information can include details, for example the name of the employee with the latest accident, or the number of accidents and the severity of the accidents. Furthermore, it may be possible to specify how the notification is to be sent and who to. For example, a notification setup may indicate that when the project's SPI crosses a threshold an email notification is sent to a manager's email account, and a phone message is sent to the project supervisor's phone. The phone message may be pre-recorded and saved on the safety management server 105 (FIG. 1) as part of the notification setup process. Additionally or alternatively, the voice message may be generated from text and a text-to-speech converter.

Once the notification component 405 generates a notification it sends the notification to the user interface component 215 (FIG. 2), which in turn sends the notification to the user. In one illustrative embodiment the notification may be an email notification, notifying the appropriate person of a safety concern with the project. In addition to generating the notification to be sent via the user interface 215, the notification component 405 may also add the notification, or the notification information, to the database 300, storing, for example, when the notification was sent and who the notification was sent to.

The notification component 405 may wait for an indication from the user interface component 215 that the notification has been sent before storing the notification information in the database 300. For example, if the notification is sent by email, the system may wait for a period of time to determine if the email was properly sent. That is, the system may wait for a period of time, for example 5 minutes, and if a negative response is not received from the email server, for example indicating that the email was undeliverable or that the recipient is out of the office, then the notification component 405 may assume that the email was sent. Once the notification has been sent, the notification information may be stored in the database.

During the notification setup process, regardless of if the information is hard coded in the system, or may be easily changed via a notification configuration file, information may be stored indicating a hierarchy of people to send notifications to. It is desirable to be able to have a level of confidence that someone in the company has received the safety notification. To ensure that the safety notification information is available to the company, in addition to the notifications that are sent, the system may update a project web site indicating that notifications have been sent.

If an additional level of assurance is needed to ensure a notification has been received, the notification component 405 can require that a notification be responded to (for example, replying to the notification email, or calling a number and entering a notification identifier). If confirmation is not received within a certain period of time (set during the notification setup) the notification component 405 may continue to send notifications to those on the notification hierarchy until a response is received.

User Interface Component 215

The user interface module 215 is responsible for the input and output of information to and from the safety management server. Generally, the input information is safety card information. Although the input information is generally considered as safety card information, it may also include for example, control information for controlling the safety management server, such as commands for starting or stopping the safety management server. The input may also include configuration information for configuring the safety management server. This information may include creating new forms, projects, users, etc. Further input information may include notification setup information, safety card form setup information, additional form information and/or additional form setup information.

The user may interface with the safety management server using a web browser based interface running on the computing device 110 (FIG. 1). The user interface component 215 may include a web server for serving the web pages to the computing device that allow for the user to interact with the server. The web server of the user interface component 215 may determine the appropriate page to serve based on communications with the control component 210. For example, an initial page may be a login page. The user interface component 205 receives the input and passes the input to a security component 415 of the control component 210 (FIG. 4), which determines if the user is allowed access to the safety management system. If the security component 415 determines that the user is allowed access then the web server may serve a menu page that presents a menu of options available to the user such as, for example if the user is a field worker, adding safety card information. If the user is not granted access by the security component 415, the web server may serve a different page, for example the login page again.

The security component 415 (FIG. 4) may verify a user's credentials and determine a level of access available to the user. This verification may be based on a username/password. The security component 415 may indicate the user's access level to the user interface component 215. The user interface component 215 may send different web pages to different users based on the access level. For example, a field employee may be served a web page that only allows them to view safety card information relating to them. A project manager may be served a page that allows them to view all safety card information relating to the project (or projects) they are managing, as well as to enter new safety card information. A CEO of a company may be served a web page that allows them access to view the safety card information for all projects being performed by the company. A company system administrator may be served a web page that allows them to modify safety card forms, notification information and rules. A government official responsible for investigating a project's safety may have access to all of the project's safety card information.

The user interface component 215 may also comprise a user input verifier which may check the user input for completeness and correctness before sending the information to the control component 210.

The user interface component 215 may also comprise a communication component that can send the notifications described above. For example, the communication component may receive a notification from the control component and send the notification as an email message. Alternatively or additionally, the notification may be sent as an SMS text message, an instant message, or converted to a voice message and sent to a phone or phone mail box.

The user interface component 215 has been described as providing the interface through a web server. It is possible to provide a different interface to the safety management server 105 (FIG. 1). For example, instead of serving web pages for viewing in a browser, the user interface component 215 may provide an interface for a front-end program running on the computing device 110 (FIG. 1).

The safety management server 105 (FIG. 1) described above provides for the storage of safety card information. This information may be entered by a project worker when an accident occurs. The computing device 110 may be a wireless device which allows the project worker to enter the information in the field. This may allow for accident information to be entered while the information is still clear in the worker's mind. This may allow for a more accurate description of the accident. The safety management server provides a notification to an appropriate person or people when the SPI of a project crosses a threshold. The safety management server 105 described above may be augmented to provide additional features.

As shown in FIG. 3, a user table 320 may be added to the database 300. The user table 320 stores user information. Each user record is identified by a unique user identifier. In addition to the user identifier, the user table 320 may also store project identifiers of projects that the user is associated with. The user table 320 also stores information about each user. The user attributes may include, for example:

User ID: unique user ID
    Name
    Address
    City
    Province
    Email
    Username
    Password
    Permissions
    Project IDs The user table 320 may be of varying complexity. For example, it may be used to only identify access privileges to users. The safety management server 105 may have different access privileges, for example a field worker on a project may only be able to enter safety card information for a project they are working on. A project manager may have the additional privilege of viewing the safety cards for a project they are responsible for and to enter new safety card information. A system administrator may be able to modify safety card information, but may not be able to add new safety cards, this may be used to correct information that was incorrectly entered. A government official may be granted access to view all safety card and notification information for all projects or for a project they are responsible for reviewing.

The user table 320 may also be used to allow for a user record to be associated with safety cards and with notifications. For example, the safety card table may include an attribute to indicate the user identifier of the worker who created the safety card, and those employees who were involved in the accident. The notification table may include a field indicating the user identifier of the user the notification was sent to.

In addition to the notification generation, the control component 210 may also determine an action to be taken as a result of a new safety card or notification. The actions may be verified by the filling out of an appropriate form similar to the safety card form. In this case, the database 300 may be augmented to include a safety action table (not shown) to store the information. Actions may be added to the action table by the control component 210 when a new notification is sent. A notification rule can indicate what action (i.e. what action form) is required to be completed when a notification is sent. Required actions may also be added to the action table manually. If a user has the proper access level, for example a company safety officer, they may add new actions. This can provide a method of implementing new safety policies and ensuring that they have been followed.

The control component 210 may include logic for checking to see if an action has been performed (based on entering a form). For example, if a notification is generated, the control logic may determine that it is necessary to provide safety training to the workers. The notification may indicate the action necessary and the form required to be completed to verify that the action has been taken. Additional notifications may be sent until the action is verified. Additionally, the notifications that are sent requiring an action to be taken may be sent to additional people. For example, the initial notification may be sent to a project manager, and if the action is not verified within a certain time, another notification may be sent, this time, for example, to the company president or a government official.

Alternatively, when safety card information is entered into the system, it may be possible to select possible observations relating to the incident of the safety card. The predefined observations may have an associated code of practice with each one to indicate the area the observation is related to. A desired action may also be selected from a predetermined list of actions. Furthermore, it may be possible to provide and track outcomes of the actions to be taken. The observations, actions and outcomes may be stored and associated with a safety card. The control component 210 may provide a report of the history of a particular safety card. For example, the report may include the original safety card information and observations, the actions taken and the outcome of those actions. Further actions may be required based on the information.

The safety management server 105 may also be used to provide a more proactive approach to safety. For example, a project manager may be required to fill out daily, weekly, etc safety cards. In this case the safety card would not indicate accident information, but would include observed information. For example, the manager may indicate that not all workers were wearing hardhats. Similar to the safety cards, proactive safety cards may be used to determine a project SPI, generate notifications and safety actions. For example, based on the above example of workers not wearing hardhats, an action may be created requiring all workers to be informed of the importance of hardhats.

The safety card forms, or additional forms (proactive safety forms, notification action forms, etc.) may be hard coded into the system, or the system may include a form creation component for allowing new forms to be generated. Each form template may be uniquely identified. This allows for a work flow to be determined based on the completion of forms. For example, a safety card may be identified by a form template ID of 1. When it is filled out, a notification may be created and sent to a user. The control component 210 may determined based on a rule set that an action must be taken as a result of the notification. For example, the action may require employees involved in the accident to undergo safety training. Each employee that undergoes the safety training may be required to fill out an additional form (for example an action form) indicating that the action has been performed. The control component may indicate the unique form template ID that is required to be filled out by the employees (for example form template ID of 2). The control component may add this information to the action table of the database 300. The control component 210 may then periodically check the action table to determine the outstanding forms that must be completed, and check to determine if the necessary forms have been received by the safety management server 105 (i.e. check if they are stored in the database 300). If they have not been received within a given period of time, the system may send a notification. If the system determines that the form has been completed, it may be removed from the action table so that further notifications will not be sent.

The action forms may have some method of verifying that the required action has actually been completed by the employee or worker and that the form has not simply been entered. This may include setting a password or key that must be entered by the employee. The password or key may only be distributed during the action, for example at the end of the safety training. Alternatively, a person responsible for the training or additional action may be required to fill out a form indicating the employees that have completed the training or action.

The actions required to be taken may be monitored on a project level to an individual user level. On the project level, an illustrative action may be to install proper safety guards on equipment (for example saws). On the user level, an illustrative action may be that the worker complete safety training (such as WHMIS training).

SPI Calculation

The safety management system may calculate an SPI value when new safety cards are received. The SPI value may be calculated in various manners. If each safety card associated with a project has an SPI rating associated with it, then the calculation may add the SPI rating of each safety card associated with a project together. This value is then checked against the SPI threshold. If it is above a threshold (set during project setup), then a notification is sent.

The above method of adding all of the SPI ratings together is simple to achieve and provides a measure of safety notification. However, once the threshold is reached a new notification is sent for every new safety card entered. Although this may be desirable in some situations, in others it may be desirable to avoid notification of all safety cards. This can be accomplished in various manners. If a notification action is associated with a notification (i.e. the system specifies an action to be taken as a result of the notification) a negative SPI rating may be associated with the action form indicating that the action has been completed. When the project SPI is calculated the notification component 405 may then sum not only the safety cards associated with the project, but also the action cards associated with the project.

Additionally or alternatively, the system may only consider the safety cards that have been received within a given time frame. The project table 305 may include a window size indicating the number of days to go back, or include, when determining the project SPI. In this manner accidents that have occurred in the past may not effect the future SPI value. For example, a window size of 60 days would sum the SPI ratings of those safety cards that have been received in the past 60 days, and ignore those received more then 60 days ago. The system may also use a weighted window, such that the SPI rating is adjusted by a weighting factor according to how long ago it occurred. For example, the SPI rating of a safety card that was received one week ago may not be adjusted at all (i.e. weighting factor=1), where as an SPI rating of a safety card that was received one month ago may be adjusted by a weighting factor=0.5 (i.e. the SPI rating is halved).

The window size and weighted window approach may be applied to all safety cards equally, or different window sizes or weighting factors may be applied to the safety cards depending on their severity level. For example, when using a window size, the project SPI may be calculated based on the SPI rating of safety cards with level 1 severity that have been received in the past month, and the SPI rating of safety cards with level 5 severity regardless of how long ago they were received.

Figure 5:
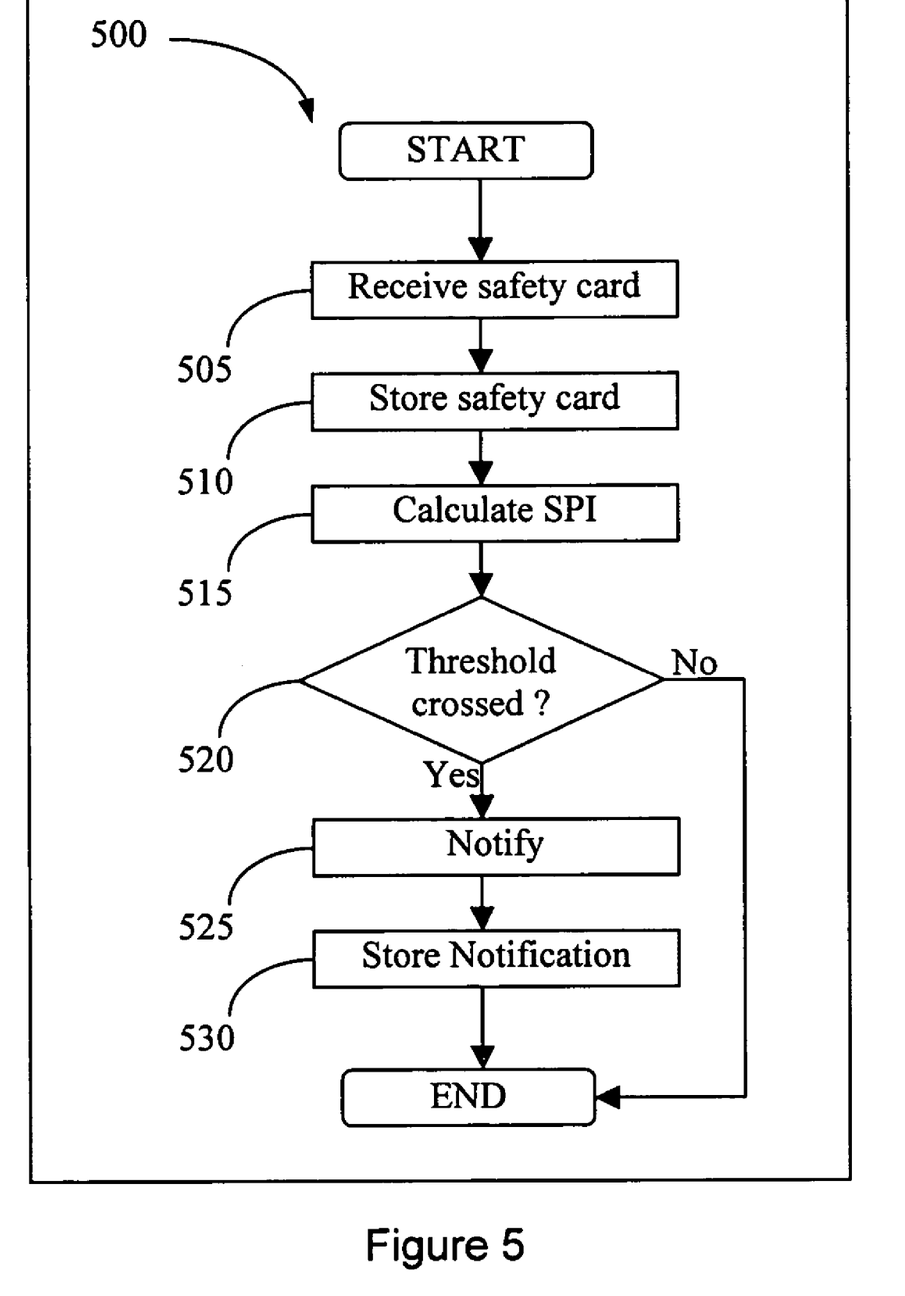
FIG. 5 shows in a flow chart a method of providing safety notification information.

FIG. 5 shows in a flow chart 500, a method of providing safety notification information. The method comprises the steps of receiving a safety card (505). As described above the safety card may be input from a user interface. Once a new safety card is received, the system stores the safety card information in the database (510). This may include assigning a unique safety card ID to the information when it is stored in the safety table. Once the new safety card is stored in the database, the project SPI value is calculated (515). The system retrieves the necessary safety cards associated with the project from the database. The relevant cards may be based on a window size as described above. Once the relevant cards are retrieved, the SPI ratings are summed. As described above, a weighting factor may be applied to the ratings prior to the summation. Once the project SPI has been calculated it is checked against the SPI threshold (520). If the threshold has not been crossed the method ends. If the SPI threshold has been crossed, the system notifies the appropriate people (525). This may require generating a notification (such as an email). The information to include in the email and the people to send the email to may be indicated, either through code in the system, or through a notification setup file etc. The generated notification is then sent to the appropriate people. Once the notification has been sent, the system stored the notification in the database (530).

The database component has been described as including various tables and records. The database could comprise fewer (or more) tables, for example all of the information could be stored in a single table or file. Each entry (for projects, notifications, safety cards, etc) may include unique identifiers and additional data.

The system described above may also be used to ensure safety qualifications of employees are maintained. For example, a project manager may be required to have special safety training that needs to be re-certified once a year. An action may be added to the action table indicating that a notification be sent to the project manager prior to the one year deadline (for example one month before). The project manager will receive the notification, and upon completing the re-certification training, can complete the necessary form indicating that the action has been completed. The notification component may then remove the action from the action table and add a new one, indicating that a notification be sent prior to the new one year deadline.

It may be possible to modify, or augment, the safety management system described above, to create a system for tracking the inspection of pressure shut-off valves (PSVs). A form may be created for entering when a new valve is installed. The system may then place an action on the action table indicating that a notification should be sent 10 months after the PSV was installed. The notification may indicate that the valve most be inspected prior to the 1 year anniversary.

An additional form may be completed indicating that the PSV was inspected. Once this form is received, the notification action may be removed from the action table, and a new notification action added, the new one indicating that the notification be sent 10 months after the inspection.

The system, modified as described above, may provide a level of assurance that pressure shut-off valves are inspected yearly to ensure they are functioning properly. The systems and methods according to the present invention may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

The system as described herein may be further modified to provide for tracking and storage of additional project information. For example, in an oil and gas project there are many documents that are typically kept in a binder over the course of the project. These documents may include for example, environmental reports, engineering reports, cost estimates, design documents, etc. The system may be modified to store these documents in a digital project binder. Unlike previous paper based systems, storing these documents in a digital binder can advantageously allow each document to be stored according to the type of document it is. For example, documents may be stored in folders relating to:

Construction data reports for piping systems
  Project documentation and Permits
  Project Safety Permits
  Ground Disturbance/Safety Certification
  Quality Control Documentation
  Quality Control Checklist/Welder Certification
  Radiography Report/X-Ray Certifications
  Test Charts/Calibration Documentation
  Drawings/As Built
  MTR'S
  Pipe Tally Sheet
  Costing—Daily Invoices
  Pictures
  Land Documents When a new document is received it may be stored into the systems database. In addition to the document, information regarding the date of the document, notes, and the category classification of the document may be included in the storage database. By classifying the documents, access to them can be controlled. For example an environmental engineer may be provided with access to ground disturbance documents and construction data reports only. A project manager may be provided with access to all the documents.

A further modification to the system described herein may provide cost tracking and analysis over the lifetime of a project. The system may be modified to provide easy entering and tracking of invoices. Each invoice may be associated with a supplier as well as possibly a supplier type. A project may be allotted a total cost estimate at the beginning of a project. By entering invoices, it is possible to view the amount of money spent to date as a portion of the total estimated costs. Since oil and gas projects typically involve various stages, each stage may be allotted a portion of the total estimated cost. Invoices can be associated with each stage and so it may be possible to determine the money spent to date for a particular stage as a portion of the allotted cost for the stage.

The system may further include the ability to store information regarding the progress to date of the project, or stages. Using the progress to date information, and the cost to date information from the invoices it is possible to determine an estimate of whether the project is currently over budget. For example if a project is estimated to have a total cost of 1 billion dollars, and the project has spent 500 million dollars but is only %10 complete, the report can easily indicate this information.

Additionally, the progress information stored in the modified system can be viewed to determine the progress of various parts of a project. Progress reports may be entered and associated with the different parts of a project. The project parts may include, for example:

Engineering/Design
  Clearing/Brushing
  Grubbing/Stripping
  Stringing
  Engineering/Bending
  Pipe Gang/Fusion Crew
  Soap Test/Shrink Sleeve
  Ditching
  Lowering in Pipe
  Tie-ins
  Backfill Trench
  Final Pig Runs
  Cleanup/Seeding
  Pipeline Risers
  Above Ground Piping By modifying the safety system as described herein to store additional information, a system can be provided that allows remote access to various users to pertinent information regarding a construction project in the oil and gas field. Advantageously, this information can be accessed remotely from the various users, which may include workers in the field to managers in a corporate office, etc. Access to the information can be provided based on a user type in order to restrict the information available to a user. Additionally the system may provide different users the ability to add or modify information. This may be used advantageously to have contractors, service providers, equipment or material suppliers, etc to add invoices to the project easily, and have them available to the right personnel.

While particular embodiments of the present invention have been shown and described, changes and modifications may be made to such embodiments without departing from the true scope of the invention.

What is claimed is:

1. A safety management system for use in industry comprising:
    a safety management server connected to a network, the safety management server comprising:
        a database component for storing safety information including:
            project information comprising at least one project entry, each project entry comprising:
                a unique project identifier; and
                project data;
            safety card information comprising at least one safety card entry, each safety card entry comprising:
                a unique safety card identifier;
                a project identifier selected from the unique project identifiers of the at least one project entry;
                safety card data;
                a safety performance index (SPI) rating indicating a level of severity of the safety card;
            action information comprising at least one action entry, each action entry comprising:
                a unique action identifier;
                a project identifier selected from the unique project identifier of the at least one project entries; and
                action data defining an action required to be taken and including an indication of if the action has been completed; and
            notification information comprising at least one notification entry, each notification entry comprising:
                a unique notification identifier;
                a project identifier selected from the unique project identifier of the at least one project entry; and
                notification card data including a unique action identifier of an action entry of the at least one action entry associated with the notification entry; and
        a control component for generating notifications and providing notification information to the database component, comprising a notification component for calculating a SPI of a project based on at least the safety card data SPI rating of at least one of the safety card entries with the project identifier corresponding to the project identifier of the received safety card information.

2. The system as claimed in claim 1, further comprising a user interface component for receiving project information and safety card information, and for sending the notifications.

3. The system as claimed in claim 1, wherein the control component generates notifications if the calculated project SPI is above an SPI threshold.

4. The system as claimed in claim 2, wherein the safety information stored by the database component further comprises:
    user information comprising at least one user entry comprising:
        a unique user identifier;
        a username; and
        a password.

5. The system as claimed in claim 4, wherein the control component further comprises a security component for determining an access privilege for a user based on a received username and password.

6. The system as claimed in claim 5, wherein each of the at least one user entries further comprises the access privilege, and wherein the security component determines the access privilege for the user by comparing the received username and password with the username and password of user entries.

7. The system as claimed in claim 5, wherein the user interface component comprises a web server for serving a web page to the user based on at least the determined access privilege.

8. The system as claimed in claim 1, wherein the generated notification is at least one of an email message, a short message service (SMS) text message or a phone message.

9. The system as claimed in claim 1, wherein the control component generates the notification based on the number of safety cards received.

10. The system as claimed in claim 1, wherein:
    the project information is stored in a project table with each project entry stored as a record of the project table;
    the safety card information is stored in a safety card table with each safety card entry stored as a record of the safety card table; and
    the notification information is stored in a notification table with each notification entry stored as a record of the notification table.

11. The system as claimed in claim 1, wherein the project information, safety card information and notification information is stored in a single table.

12. A method of managing the safety of projects comprising:
    receiving safety card data including an indication of a project the safety card data is associated with and a safety performance index (SPI) rating indicating a level of severity of the safety card;
    storing in a database including one or more unique project identifiers and associated project data, safety card information comprising the received safety card data, an associated unique safety card identifier and a project identifier of the at least one unique project identifier of the database;
    generating a notification and associated notification information when a project SPI determined based on at least the SPI rating of at least one of the safety card entries with the project identifier corresponding to the project is above an SPI threshold;
    storing in the database the notification information comprising notification data, an associated unique notification identifier and a project identifier of the at least one unique project identifiers associated with each project data;

sending the generated notification; and calculating a project SPI based on at least the SPI rating associated with at least one safety card data with the unique project identifier corresponding to the project identifier of the received safety card data.

13. The method as claimed in claim 12 wherein the stored safety card information further comprises an SPI rating associated with the safety card data.

14. The method as claimed in claim 12, wherein sending the generated notification comprises at least one of:

sending the notification in an email message;

sending the notification in a short message service (SMS) text message; or sending the notification in a phone message.

15. A computer-readable medium storing instructions or statements for use in the execution in a computer of a method of managing the safety of projects, the method comprising:

receiving safety card data including an indication of a project the safety card data is associated with an a safety performance index (SPI) rating indicating a level of severity of the safety card;

storing in a database including one or more unique project identifiers and associated project data, safety card information comprising the received safety card data, an associated unique safety card identifier and a project identifier of the at least one unique project identifier of the database;

generating a notification and associated notification information when a project SPI determined based on at least the SPI rating of at least one of the safety card entries with the project identifier corresponding to the project is above an SPI threshold;

storing in the database the notification information comprising notification data, an associated unique notification identifier and a project identifier of the at least one unique project identifiers associated with each project data;

sending the generated notification; and calculating a project SPI based on at least the SPI rating associated with at least one safety card data with the unique project identifier corresponding to the project identifier of the received safety card data.

\* \* \* \* \*